United States Patent
McMurtry et al.

(10) Patent No.: US 9,052,177 B2
(45) Date of Patent: Jun. 9, 2015

(54) METROLOGY APPARATUS

(75) Inventors: David Roberts McMurtry, Dursley (GB); Stephen Paul Hunter, Chipping Sodbury (GB)

(73) Assignee: RENISHAW PLC, Wotton-Under-Edge (GB)

( * ) Notice: Subject to any disclaimer, the term of this patent is extended or adjusted under 35 U.S.C. 154(b) by 136 days.

(21) Appl. No.: 13/809,427

(22) PCT Filed: Jul. 20, 2011

(86) PCT No.: PCT/GB2011/001086
§ 371 (c)(1),
(2), (4) Date: Jan. 10, 2013

(87) PCT Pub. No.: WO2012/010836
PCT Pub. Date: Jan. 26, 2012

(65) Prior Publication Data
US 2013/0111774 A1  May 9, 2013

Related U.S. Application Data

(60) Provisional application No. 61/366,664, filed on Jul. 22, 2010.

(30) Foreign Application Priority Data

Jul. 21, 2010  (GB) .................................. 1012249.7

(51) Int. Cl.
*G01B 5/016* (2006.01)
*G01B 7/016* (2006.01)
(Continued)

(52) U.S. Cl.
CPC .............. *G01B 5/0016* (2013.01); *G01B 5/016* (2013.01); *G01B 7/016* (2013.01); *G01B 5/012* (2013.01); *F16C 39/063* (2013.01)

(58) Field of Classification Search
CPC ....... G01B 5/0016; G01B 5/016; G01B 7/016
USPC ................................ 33/503, 556, 559, DIG. 1
See application file for complete search history.

(56) References Cited

U.S. PATENT DOCUMENTS 4,320,927 A * 3/1982 Sertich .......................... 310/90.5
5,019,738 A * 5/1991 Weilbach et al. ............ 310/90.5
(Continued)

FOREIGN PATENT DOCUMENTS

CN    1651780 A     8/2005
CN    200950115 Y  9/2007
(Continued)

OTHER PUBLICATIONS

British Search Report issued in British Application No. 1012249.7 dated Oct. 19, 2010.
(Continued)

*Primary Examiner* — Christopher Fulton
(74) *Attorney, Agent, or Firm* — Oliff PLC

(57) ABSTRACT

Metrology apparatus is described that includes a first structure rotatably connected to a second structure by a bearing arrangement. The bearing arrangement includes at least a first friction bearing including parts in sliding contact during rotation of the first structure relative to the second structure. The apparatus includes at least one magnet that relieves the load on the first friction bearing. Multiple magnets, provided in an attracting or repelling arrangement, may be used. The metrology apparatus may include an articulating probe head for a coordinate positioning apparatus.

13 Claims, 3 Drawing Sheets

Figure 1:
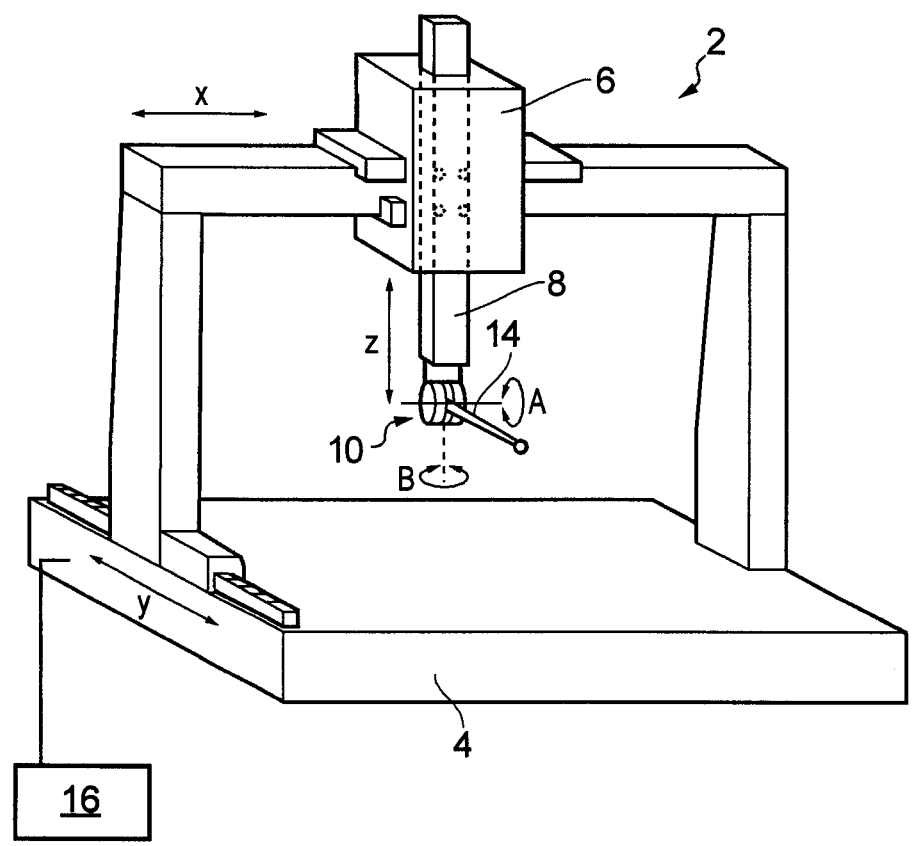

(51) Int. Cl.
*G01B 5/00* (2006.01)
*G01B 5/012* (2006.01)
*F16C 39/06* (2006.01)

(56) References Cited

U.S. PATENT DOCUMENTS

| | | | |
|---|---|---|---|
| 5,174,039 A * | 12/1992 | Murai | 33/556 |
| 5,327,657 A * | 7/1994 | Hajdukiewicz et al. | 33/503 |
| 5,789,838 A * | 8/1998 | Gondhalekar | 310/90.5 |
| 5,848,477 A * | 12/1998 | Wiedmann et al. | 33/503 |
| 8,365,426 B2 * | 2/2013 | Ruck | 33/503 |
| 2003/0048969 A1 | 3/2003 | Hunter et al. | |
| 2007/0126314 A1* | 6/2007 | Ohmori et al. | 310/316.01 |
| 2008/0148588 A1* | 6/2008 | Yoshizumi et al. | 33/561 |
| 2009/0235397 A1 | 9/2009 | Hon et al. | |

FOREIGN PATENT DOCUMENTS

| | | |
|---|---|---|
| CN | 201206598 Y | 3/2009 |
| CN | 101532818 A | 9/2009 |
| EP | 1 307 710 131 B1 | 9/2005 |
| JP | H05-312504 A | 11/1993 |
| JP | A-9-61336 | 3/1997 |
| JP | A-10-54739 | 2/1998 |
| JP | A-10-54740 | 2/1998 |
| JP | A-2001-304257 | 10/2001 |
| JP | 2003-247483 A | 9/2003 |
| JP | 2004-506161 A | 2/2004 |
| JP | A-2004-239712 | 8/2004 |
| WO | WO 2008/001069 A2 | 1/2008 |
| WO | WO 2008/055917 A2 | 5/2008 |
| WO | WO 2009/027660 A2 | 3/2009 |
| WO | WO 2009/049070 A2 | 4/2009 |

OTHER PUBLICATIONS

International Search Report issued in International Patent Application No. PCT/GB2011/001086 dated Jun. 3, 2012.
Written Opinion issued in International Patent Application No. PCT/GB2011/001086 dated Jun. 3, 2012.
Aug. 19, 2014 Office Action issued in Chinese Application No. 201180035200.05.
Feb. 24, 2015 Office Action issued in Japanese Application No. 2013-520201.

* cited by examiner

METROLOGY APPARATUS

The present invention relates to metrology apparatus comprising at least one friction bearing and in particular to such metrology apparatus in the form of an articulating probe head for coordinate positioning apparatus that includes at least one magnet for relieving the load carried by the friction bearing.

The relative motion of two structures needs to be accurately controlled in many different metrology applications. It is known, for example, to mount a measurement probe to the quill of a coordinate measuring machine (CMM) using an articulating probe head that can rotate the measurement probe about two rotary axes relative to the quill. Articulating probe heads have been proposed previously that include various different types of bearing for defining the axes of rotation with the required level of accuracy. For example, the use of high precision air bearings in an articulating probe head is described in WO2008/001069. Although such an air bearing arrangement can provide the necessary accuracy, the various components of such a bearing need to be fabricated to tight tolerances thereby making such bearings relatively large and expensive. Various examples of cheaper, more compact, friction bearing arrangements for use in an articulating probe head have also been described previously in EP1307710. It has, however, been found by the present inventors that the performance that can be obtained using such friction bearings can be unacceptable, especially under higher loads.

According to the first aspect of the invention, metrology apparatus is provided that comprises a first structure rotatably connected to a second structure by a bearing arrangement, the bearing arrangement including at least a first friction bearing comprising parts in sliding contact during rotation of the first structure relative to the second structure, characterised in that the apparatus comprises at least one magnet that relieves the load on the first friction bearing.

The present invention thus provides metrology apparatus in which the mechanical load carried by a first friction bearing connecting two structures is relieved by the inclusion of one or more magnets. In other words, a magnetic (non-contact) force is provided in parallel with the first friction bearing to carry at least some of the load that is transmitted between the first and second structures. In this manner, the load carried by the first friction bearing is reduced relative to the load that would have been carried in the absence of the at least one magnet.

A friction bearing, by definition, includes parts that slide whilst they are in physical contact with one another. Relieving the load carried by such a friction bearing using at least one magnet in accordance with the present invention has been found to offer a number of advantages. Firstly, the present invention has been found to overcome a problem that is present when attempting to use friction bearings in metrology applications where very precise control over the relative motion of two structures is required. In particular, it has been found by the present inventors that transmitting relatively high loads through a friction bearing in such metrology apparatus can introduce unwanted metrology errors. For example, when a high load is passed through a friction bearing there will be an initial or starting amount of friction ("stiction") that has to be overcome before smooth sliding motion occurs between the bearing parts. This effect has been found to reduce the ability to precisely control the relative motion of structures connected by a friction bearing thereby introducing dynamic and static uncertainties into the relative position of the two structures linked by the bearing. Relieving the first friction bearing of some of the mechanical load in accordance with the present invention has been found to reduce such motion control problems thereby improving the measurement accuracy that can be obtained using the metrology apparatus.

The reduced friction that occurs in metrology apparatus of the present invention also reduces the amount of mechanical wear of the contacting parts of the first friction bearing over time. The metrology lifetime of the bearing assembly of the present invention is thus increased relative to bearing assemblies in which no such magnet(s) are included and/or the hardness of material that is required to provide a bearing having a certain operational lifetime can be reduced. In addition, the lower friction to be overcome reduces the work that needs to be done to rotate the first and second structures relative to one another. If the apparatus includes an electrical motor to drive such rotation, the size and power consumption of that motor can thus also be reduced. Reducing the power consumption of such a motor will also reduce the amount of heat that is generated by the motor, thereby reducing any heat induced metrology effects (e.g. due to thermal expansion).

Magnetic attraction or repulsion may be used to relieve the load on the first friction bearing. Advantageously, the at least one magnet comprises a plurality of magnets arranged in a repelling arrangement that relieves the load on the first friction bearing. For example, said at least one magnet may comprise one or more first magnets and one or more second magnets. The one or more first magnets may be affixed to, or provided as part of, the first structure. The one or more second magnets may be affixed to, or provided as part of, the second structure. The first and second magnets may be arranged to repel one another thereby relieving the load on the first friction bearing. In other words, the same poles of first and second magnets may be placed in opposition to generate the required magnetic repulsion force.

Instead of magnetic repulsion, said at least one magnet may relieve the load on the first friction bearing by magnetic attraction. For example, one or more magnets may be affixed to, or formed as part of, at least one of the first structure and the second structure. The one or more magnets may be attracted to magnetic material (e.g. steel) or to the opposite pole of anther magnet. The one or more magnets may then be arranged to impart a magnetic attraction force between the first structure and the second structure that relieves the load on the first friction bearing.

The at least one magnet of the metrology apparatus may comprise at least one electromagnet. Advantageously, the at least one magnet comprises at least one permanent magnet. A permanent magnet is preferred as it requires no power supply. Preferably, the magnet comprises a rare earth magnet.

Advantageously, one of the parts of the first friction bearing in sliding contact with another part comprises a ball. Conveniently, the other part of the first friction bearing comprises one or more bearing surfaces. Advantageously, the parts of the first friction bearing comprise a ball that is in sliding contact with the one or more bearing surfaces. The first structure or the second structure may comprise the ball and the other of the first structure or the second structure may comprise the one or more bearing surfaces. The one or more bearing surfaces may, for example, comprise a plurality of bearing surfaces that ride on the surface of the ball and ensure the ball centre remains in a substantially invariant location relative the bearing surfaces. In this manner, the bearing surfaces and ball accurately define a pivot point. The first structure is thus rotatable relative to the second structure about the centre of the ball.

The bearing arrangement linking the first and second structures may take the form of a pivot joint that permits free relative rotation or pivoting of the first and second structures about a pivot point defined by the first friction bearing.

Advantageously, the bearing arrangement permits rotation of the first structure relative to the second structure about a first axis. In other words, motion of the first structure relative to the second structure may (in use) be restricted by the bearing assembly to solely rotation about the first axis.

Advantageously, the bearing arrangement may comprise one or more further bearings. The one or more further bearings may, in conjunction with the first friction bearing, define the first axis about which the first structure can rotate relative to the second structure. Preferably, the first friction bearing and the one or more further bearings are located on the first axis. The one or more further bearings may comprise one or more bearings of any type. Preferably, the one or more further bearings comprise a second friction bearing. Advantageously, all the bearings of the bearing assembly are friction bearings. Constraining motion between the first and second structures using friction bearings permits an axis of rotation to be accurately defined. The bearing assembly may, for example, kinematically constrain five degrees of freedom of motion between the first and second structures and allow only rotation of the first structure relative to the second structure about the first axis.

A variety of friction bearing designs are known to those skilled in the art. For example, reference is made to the various friction bearings described in EP1307710, the contents of which are hereby incorporated by reference. Advantageously, the first and second friction bearings each comprise a ball in contact with one or more complementary bearing surfaces. The balls of the first and second friction bearings may be the same diameter or may be different diameters (e.g. if the different friction bearings are arranged to carry different loads).

Advantageously, the first structure comprises a first set of bearing surfaces spaced apart from a second set of bearing surfaces. Conveniently, the second structure comprises a shaft having a first ball and a second ball, the first and second ball being spaced apart along the longitudinal axis of the shaft. In such an arrangement, the first friction bearing may be provided by the first ball and the first set of bearing surfaces and the second friction bearing may be provided by the second ball and the second set of bearing surfaces. A bias or preload may also be provided to ensure contact is maintained between each ball and its respective bearing surfaces. The second structure may comprise a spindle that extends from the shaft of the second structure (e.g. beyond the bearing assembly) along the direction of the first axis. The spindle may carry further apparatus, such as a further rotary joint and/or a measurement probe or the like.

The first set of bearing surfaces of the above described arrangement may be provided in a first contact plane and the second set of bearing surfaces may be provided in a second contact plane. The first and second contact planes may be substantially parallel. The first and/or second contact planes may be substantially orthogonal to the longitudinal axis of the shaft. At least one of the first and second friction bearings may be resiliently displaceable out of its contact plane in a direction parallel to the longitudinal axis of the shaft; e.g. the bearing may have a structure of the type described in EP1307710. In this manner, the first and second friction bearings define that relative rotation of the first and second structures occurs substantially about the longitudinal axis of the shaft. The bearing assembly thus defines the first axis of rotation mentioned above.

Advantageously, the first axis is aligned in a substantially vertical direction when the metrology apparatus is being used. In other words, the first axis is preferably substantially parallel to the vertical direction in which gravity acts. In such an example, if the first structure is secured to an object (e.g. the quill of a CMM) then the first friction bearing preferably carries the load (relieved by the action of the at least one magnet) due to the weight of the second structure and anything that is carried by the second structure. The at least one magnet can thus, in such an example, be seen to reduce the load on the first friction bearing that arises from holding the second structure against the force of gravity. It should be noted that although the at least one magnet relieves the load carried by the first friction bearing, it does not bypass the load carried by the first friction bearing completely. Preferably, the load transmitted via the first friction bearing remains sufficient to ensure the parts of the first friction bearing that are in sliding contact define the required relative motion between the first and second structures.

It should again be noted that application of the present invention is not limited to any particular friction bearing configuration. The concept of relieving the load on a friction bearing may be applied to any friction bearing configuration.

Advantageously, the apparatus comprises at least one mechanical stop. The parts of the first friction bearing that are in sliding contact are conveniently arranged to disengage when subjected to a mechanical shock. Preferably, the amount of displacement permitted during disengagement of the parts of the first friction bearing that are in sliding contact is limited by the at least one mechanical stop. The first structure and/or the second structure may comprise the at least one mechanical stop.

Preferably, the at least one mechanical stop is arranged to prevent the parts of the first friction bearing that are in sliding contact during normal use from impacting any other surfaces of the apparatus if they are disengaged by a mechanical shock. In other words, the one or more mechanical stops preferably prevent the parts of the first friction bearing that define the rotary motion from being damaged due to a mechanical shock or unexpected impact of some kind. This allows the apparatus to continue operation after being subjected to a mechanical shock without the need to replace the parts of the friction bearing or even recalibrate the metrology apparatus. The amount of mechanical shock that the apparatus is capable of withstanding will obviously be dependent on the exact configuration of such apparatus, but the ability of the parts of the first friction bearing to disengage in this manner have been found to greatly increase the resilience of the metrology apparatus compared to apparatus in which such a shock force would have to be carried through the surfaces of the friction bearing that are in sliding contact.

Advantageously, the parts of the first friction bearing are arranged to reengage (i.e. to re-establish sliding contact) after being disengaged by a mechanical shock. Advantageously, the net load carried by the first friction bearing (i.e. the load as reduced by the effect of the at least one magnet) acts to bias the parts of the first friction bearing back into sliding contact. If a mechanical stop is provided, this may also act to ensure the relative displacement between the parts of the first friction bearing that occurs during disengagement is sufficiently small that the bias results in the parts reengaging. To aid reengagement of this type, it is preferable if a magnetic repulsion arrangement for relieving the load on the first friction bearing is implemented. The use of magnetic repulsion is preferred because it ensures the at least magnet does not "stick" to another magnet or magnetic surface and thereby prevent reengagement.

The metrology apparatus may be manually actuated or motorised. The apparatus advantageously comprises at least one motor for moving (e.g. rotating) the first structure relative to the second structure. The metrology apparatus may also include a device for measuring rotation of the first structure relative to the second structure. For example, the apparatus preferably includes at least one rotary encoder for measuring rotation of the first structure relative to the second structure. A position controller may also be provided for controlling motion of the first structure relative to the second structure. The position controller may thus control at least one motor using feedback from at least one encoder. Such a position controller may be arranged to provide the desired relative motion of the first and second structures, such control being improved by virtue of the reduced load passing through the first friction bearing arising from the inclusion of the at least one magnet.

The above described metrology apparatus may be used in many different metrology applications. For example, a pivot joint for a non-Cartesian co-ordinate positioning apparatus (e.g. a hexapod) may comprise the metrology apparatus of the present invention. Articulating metrology apparatus, such as a robotic arm or articulating probe head, may also comprise the metrology apparatus of the present invention. Preferably, the metrology apparatus of the present invention forms part of the metrology or measurement loop of the apparatus in which it is used. For example, the part of the apparatus that is used for measuring positions on an object may comprise the metrology apparatus.

Advantageously, the metrology apparatus of the present invention is provided as part of an articulating probe head. Such an articulating probe head preferably comprises a base for attachment to the quill of co-ordinate positioning apparatus. The articulating probe head may also conveniently comprise a support for a measurement probe. The articulating probe head may then comprise one or more articulating joints that allow the support to be rotated about one or more rotary axes relative to the base. Preferably, the articulating probe head comprises two articulating joints that allow the support to be rotated about two mutually orthogonal rotary axes relative to the base. Advantageously, at least one of the articulating joints comprises metrology apparatus as described above.

Advantageously, the articulating probe head comprises at least first and second articulating wrists or joints connecting the base and the support thereby allowing the support to be rotated about at least first and second rotary axes relative to the base. Preferably, the first articulating joint comprises the above described metrology apparatus of the present invention. For example, the first structure of the metrology apparatus may form part of, or be affixed, to the base. The second structure may then comprise or be connected to the support, optionally via a further articulating joint. The bearing assembly of the metrology apparatus may then define a first rotary axis between the base and the support. Advantageously, the first rotary axis of motion is substantially vertical such that the load carried by the first friction bearing of the bearing assembly (which is relieved by the at least one magnet) arises from the weight of the second structure, the associated support and any measurement probe attached to the support.

The above described articulating probe head may be manually actuated and/or motorised. The probe head may comprise an indexing probe head that permits the measurement probe to adopt a plurality of nominally repeatable indexed orientations relative to the platform. In other words, the probe head may allow the measurement probe to be indexed and held in multiple nominal positions. Conveniently, the measurement probe is attached to the platform by a so-called continuous or active probe head. The continuous probe head conveniently allows the measurement probe to be freely rotated or placed into any orientation within a predefined angular range. Preferably, the continuous probe head comprises at least one encoder for measuring the orientation of the measurement probe. The orientation of the measurement probe may be held or locked during measurement or the measurement probe may be reoriented (e.g. scanned or moved) during a measurement process.

The articulating probe head may carry any type of measurement probe. The measurement probe may be a contact probe (e.g. having a workpiece contacting stylus). Alternatively, the measurement probe may be a non-contact (e.g. optical, capacitive, inductive etc) probe. The measurement probe and articulating probe head may comprise separate units that can be releasably attached to one another. Alternatively, the measurement probe may be integrated with a support within the articulating probe head.

According to a second aspect of the invention, metrology apparatus is provided that comprises at least a first friction bearing, wherein the apparatus comprises at least one magnet for relieving the load carried by the first friction bearing. The skilled person would appreciate that the term friction bearing relates to a bearing in which there is sliding contact between parts. The term friction bearing does not include air bearings, roller bearings or the like in which there is no such sliding contact. The apparatus may also include any of the preferred features described above.

According to a third aspect of the invention, metrology apparatus is provided that comprises at least a first friction bearing, wherein the apparatus comprises a non-contact force generation means for relieving the load carried by the first friction bearing. The non-contact force generation means may, for example, comprise one or more magnets, an electrostatic arrangement etc. The apparatus may also include any of the preferred features described above.

According to a fourth aspect of the invention, metrology apparatus is provided that comprises a first structure rotatably connected to a second structure by a bearing arrangement, the bearing arrangement including at least a first friction bearing comprising parts in sliding contact during rotation of the first structure relative to the second structure, characterised in that the apparatus comprises at least one mechanical stop, wherein the parts of the first friction bearing that are in sliding contact are arranged to disengage when subjected to a mechanical shock, wherein the amount of displacement permitted during such disengagement is limited by the at least one mechanical stop. Advantageously, the apparatus comprises at least one magnet that relieves the load on the first friction bearing. The apparatus may also include any of the preferred features described above.

Figure 2:
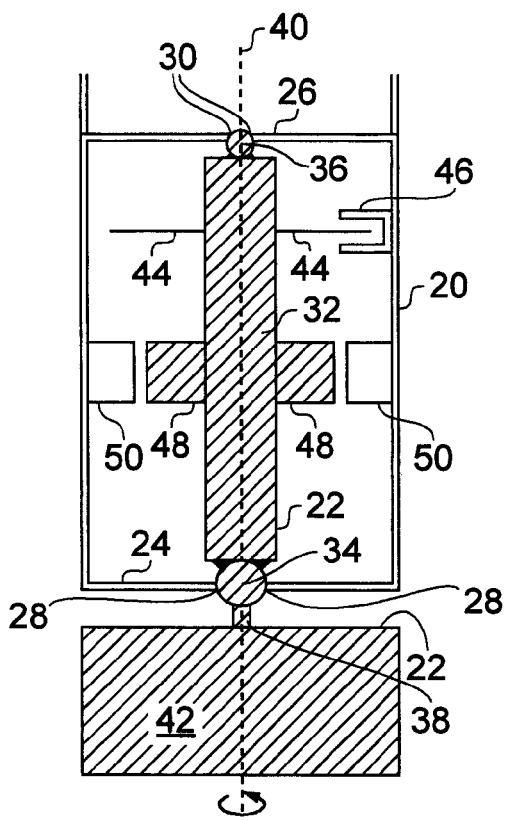
Figure 3:
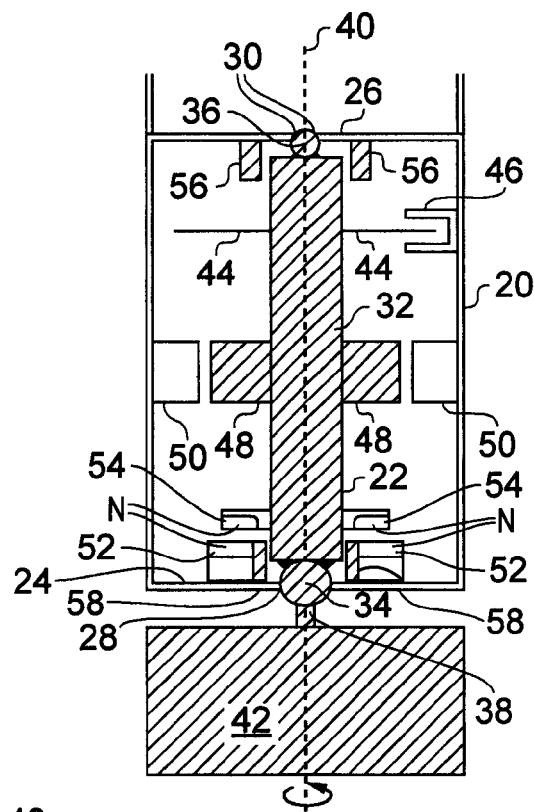
Figure 4:
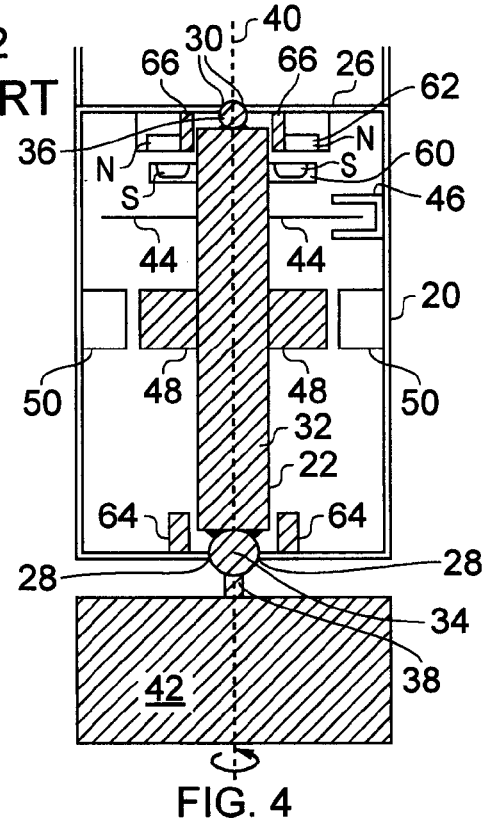
Figure 5:
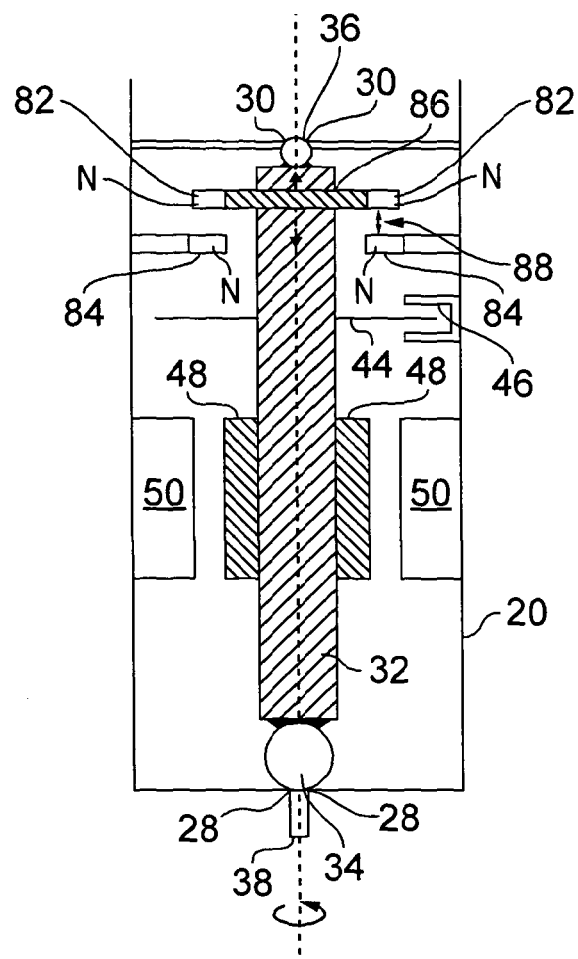

The invention will now be described, by way of example only, with reference to the accompanying drawings in which:

FIG. 1 illustrates a coordinate positioning machine comprising an articulating probe head, FIG. 2 illustrates a prior art friction bearing for an articulating joint, FIG. 3 illustrates a friction bearing for an articulating joint in accordance with the present invention in which the load is reduced by magnet repulsion, FIG. 4 illustrates a friction bearing for an articulating joint in accordance with the present invention in which the load is reduced by magnet attraction, and FIG. 5 illustrates a further friction bearing for an articulating joint in accordance with the present invention in which the load is reduced by magnet repulsion.

Referring to FIG. 1, a coordinate positioning apparatus in the form of a coordinate measuring machine (CMM) 2 is shown. The CMM 2 comprises a base or table 4 on which an object (e.g. a workpiece) can be placed and a gantry 6 that is moveable along x and y directions with respect to the base 4.

The gantry 6 includes a quill 8 which is moveable along a z direction with respect to the gantry 6. Position encoders are provided on each axis of the CMM 2 to measure the position of the quill in the x, y and z directions. Measurements of quill position are thus made in the so-called machine co-ordinate (x,y,z) system.

The quill 8 carries a motorised articulating probe head 10. The articulating probe head 10 comprises a base portion that is attached to the quill 8 and a probe support carrying a measurement probe 12 having a deflectable stylus 14. The measurement probe 12 may be a touch trigger probe (also called a switching probe) in which a trigger (or switching) signal is issued whenever the stylus is deflected. Alternatively, the measurement probe 12 may be a scanning probe that outputs a measure of the amount of deflection (e.g. in a local or probe coordinate system) of the stylus 14 away from a so-called neutral or rest position. The articulating probe head 10 allows the measurement probe 12 to be rotated, relative to the quill, about the orthogonal axes A and B. A controller 16 is also provided to control operation of the CMM and the articulating probe head 10.

Referring to FIG. 2, the articulating joint of an articulating probe head is schematically illustrated. The articulating joint comprises a bearing assembly linking a first (e.g. base) structure 20 to a second structure 22.

The first structure 20 comprises a housing including a lower plate 24 and an upper plate 26. The lower plate 24 comprises a first set of bearing surfaces 28 and the upper plate 26 comprises a second set of bearing surfaces 30. The second structure 22 comprises a shaft 32 having a first ball 34 at its lower end and a second ball 36 at its upper end. A spindle 38 having a longitudinal axis coincident with the longitudinal axis of the shaft 32 passes through the first ball 34 and holds a support 42 for a measurement probe (not shown).

The first structure 20 is linked to the second structure 22 by a bearing assembly that comprises a first friction bearing and a second friction bearing. The first friction bearing comprises the first ball 34 in sliding contact with the first set of bearing surfaces 28. The second friction bearing comprises the second ball 36 in sliding contact with the second set of bearing surfaces 30. The upper plate 26 is spring biased to exert a downward or pre-load force on the shaft 32 via the second friction bearing; this ensures sliding contact occurs at both the first friction bearing and the second friction bearing. The friction bearing of the bearing assembly thus accurately define a first axis 40 about which the second structure 22 can rotate relative to the first structure 20. An encoder disk or scale 44 is attached to the shaft 32 and an encoder readhead 46 is attached to the first structure 20. Such an encoder arrangement permits relative rotation of the first and second structures to be measured. The joint is motorised and includes complementary motor elements 48 and 50 on the shaft 32 and first structure 20 respectively to drive relative rotation of the first and second structures.

It can be seen that the load carried by the first friction bearing arises from the weight of the second structure 22 plus the preload force applied to the shaft 32. Although the size of the first ball 34 can be larger than that of the second ball 36 to enable a larger load to be carried, it has been found by the present inventors that problems still arise when attempting to use the first friction bearing to carry this load. In particular, it has been found that initial or starting friction may cause the first friction bearing to stick during initial motion from a stationary start or when rotation is required at a low speed. This frictional effect is unpredictable and makes the rotary motion of the first and second structures difficult to accurately control. In particular, this effect adds complexity to the motion control feedback loop that is implemented by the controller; i.e. the control loop that reads rotational information from the encoder and then applies appropriate motor control signals in order to achieve a commanded rotary motion needs to take account of this frictional effect. These frictional effects have also been found to reduce the overall accuracy with which the rotational orientation of the first and second structure can be measured and controlled at lower speeds thereby reducing the levels of measurement accuracy that be obtained using a machine including such an articulating probe head.

Referring to FIG. 3, an articulating joint in accordance with the present invention is shown. In addition to the various components described above with reference to FIG. 2, the joint also comprises a first set of magnets 52 attached to the first structure 20 and a second set of magnets 54 attached to the shaft 32 of the second structure. The magnets of the first and second sets are spaced apart from one another in the longitudinal direction of the shaft 32 and have the same magnetic poles (in this case North poles) facing each other. A magnetic repulsion force is thus established between the sets of magnets 52 and 54 which carries some of the mechanical load that would otherwise be transmitted through the first friction bearing. In other words, the magnets 52 and 54 relieve the load passed between the first ball 34 and the first set of bearing surface 28 of the first friction bearing.

Reducing the load carried by the first friction bearing using the sets of magnets 52 and 54 eases the motion control problems mentioned above, without having to resort to an alterative type of bearing. Furthermore, the first friction bearing (in combination with the second friction bearing in this example) still acts to accurately define the axis of rotation provide by the bearing assembly. In other words, relieving the load with the non-contact, magnetic, force does not reduce the accuracy of rotation as defined by the bearing assembly.

The articulating joint may also include one or more stops to prevent the metrology surface of the bearing assembly being damaged by a mechanical shock or disturbance. In particular, an upper stop 56 may be provided adjacent the upper end of the shaft 32 and a lower stop 58 may be provided adjacent the lower end of the shaft 32. As mentioned above, the upper plate 26 is spring biased into engagement with the shaft 32 and hence the shaft may move relative to the first structure. The stops 56 and 58 act to limit motion of the shaft 32 relative to the first structure 20 thereby ensuring the shaft always returns to its previous position when the shock force is removed. The stops 56 and 58 are also preferably positioned to limit shaft motion so as to prevent the balls or bearing surface from being damaged.

Referring to FIG. 4, an alternative structure to that of FIG. 3 is illustrated. In place of the magnetic repulsion effect provided in the apparatus described with reference to FIG. 3, the arrangement of FIG. 4 includes a first set of magnets 60 attached to the upper end of the shaft 32 of the second structure and a second set of magnets 62 attached to the upper plate 26 of the first structure 20. The sets of magnets 60 and 62 are arranged to attract one another, which also has the effect of reducing the load transmitted through the first friction bearing. Stops 64 and 66 may again be provided to limit motion of the shaft 32 and protect the metrology surfaces of the friction bearings.

Referring to FIG. 5, a further alternative structure to that of FIG. 3 is illustrated. In this example, a first set of magnets 82 are attached to the upper end of shaft 32 by a lockable screw thread attachment 86. A second set of magnets 84 are attached to the first structure 20. In common with the arrangement of FIG. 3, the first and second sets of magnets 82 and 84 are arranged to repel one another thereby reducing the load transmitted through the first friction bearing. The lockable screw thread attachment 86 allows the position of the first set of magnets 82 along the axis of the shaft 32 to be adjusted. This permits the gap 88 between the first and second sets of magnets 82 and 84 to be varied, thereby allowing the force transmitted via the magnets (and hence the proportion of the load passed through the first friction bearing) to be adjusted.

It should be remembered that the above described embodiments are merely illustrative of the invention. Although metrology apparatus in the form of a rotary joint for an articulating probe head is shown, the skilled person would appreciate that the apparatus could be used in many alternative metrology applications. For example, the apparatus may be used in robots, articulating arms etc. The above examples also show a bearing assembly comprising a pair of friction bearings that define rotary motion of two structure about a single rotary axis. The present invention could also be applied to reduce the load carried by a friction bearing in the form of a pivot joint that may be used, for example, in non-Cartesian (e.g. hexapod) structures or the like. The skilled person would immediately recognise the wide variety of applications of the present invention.

The invention claimed is:

1. A metrology apparatus, comprising:
    a first structure rotatably connected to a second structure by a bearing arrangement, the bearing arrangement including at least a first friction bearing comprising parts in sliding contact during rotation of the first structure relative to the second structure;
    at least one magnet that relieves the load on the first friction bearing; and
    at least one mechanical stop,
    wherein the parts of the first friction bearing that are in sliding contact are arranged to disengage when subjected to a mechanical shock, the amount of displacement permitted during such disengagement being limited by the at least one mechanical stop.

2. An apparatus according to claim 1, wherein the at least one magnet comprises a plurality of magnets arranged in a repelling arrangement that relieves the load on the first friction bearing.

3. An apparatus according to claim 1, wherein said at least one magnet relieves the load on the first friction bearing by magnetic attraction.

4. An apparatus according to claim 1, wherein the at least one magnet comprises at least one permanent magnet.

5. An apparatus according to claim 1, wherein the first friction bearing comprises a ball in sliding contact with one or more bearing surfaces, the first structure being rotatable relative to the second structure about the centre of the ball.

6. An apparatus according to claim 1, wherein the bearing arrangement permits rotation of the first structure relative to the second structure about a first axis.

7. An apparatus according to claim 6, wherein the bearing arrangement comprises one or more further bearings, the first friction bearing and the one or more further bearings being located on the first axis.

8. An apparatus according to claim 7, wherein the one or more further bearings comprises a second friction bearing.

9. An apparatus according to claim 8, wherein the first structure comprises a first set of bearing surfaces spaced apart from a second set of bearing surfaces and the second structure comprises a shaft having a first ball and a second ball spaced apart along its longitudinal axis, wherein the first friction bearing is provided by the first ball and the first set of bearing surfaces and the second friction bearing is provided by the second ball and the second set of bearing surfaces.

10. An apparatus according to claim 7, wherein, in use, the first axis is aligned in a substantially vertical direction.

11. An apparatus according to claim 1, comprising at least one motor for moving the first structure relative to the second structure, at least one rotary encoder for measuring rotation of the first structure relative to the second structure and a position controller for controlling the at least one motor using feedback from the at least one encoder.

12. An articulating probe head, comprising a base for attachment to the quill of a co-ordinate positioning apparatus and a support for a measurement probe, wherein at least first and second articulating joints connect the base and the support thereby allowing the support to be rotated about at least first and second rotary axes relative to the base, wherein the first articulating joint comprises the metrology apparatus according to claim 1.

13. A metrology apparatus, comprising:
    a first structure rotatably connected to a second structure by a bearing arrangement, the bearing arrangement including at least a first friction bearing comprising parts in sliding contact during rotation of the first structure relative to the second structure; and
    at least one mechanical stop,
    wherein the parts of the first friction bearing that are in sliding contact are arranged to disengage when subjected to a mechanical shock, and
    wherein the amount of displacement permitted during such disengagement is limited by the at least one mechanical stop.

* * * * *